US009208746B2

(12) United States Patent
Chao et al.

(10) Patent No.: US 9,208,746 B2
(45) Date of Patent: Dec. 8, 2015

(54) SIGNAL TRANSMISSION SYSTEMS OF ELECTRONIC DISPLAY DEVICES AND TRANSMISSION METHODS

(71) Applicant: Nuvoton Technology Corporation, Hsinchu (TW)

(72) Inventors: Mu-Lin Chao, Jhubei (TW); Jang-Ming Liang, Zhubei (TW)

(73) Assignee: Nuvoton Technology Corporation, Hsinchu (TW)

( * ) Notice: Subject to any disclaimer, the term of this patent is extended or adjusted under 35 U.S.C. 154(b) by 409 days.

(21) Appl. No.: 13/726,410

(22) Filed: Dec. 24, 2012

(65) Prior Publication Data
US 2013/0201079 A1   Aug. 8, 2013

(30) Foreign Application Priority Data

Feb. 2, 2012   (TW) .............................. 101103331 A

(51) Int. Cl.
*G09G 5/00*      (2006.01)
*G09G 5/12*      (2006.01)
*G06F 3/14*      (2006.01)

(52) U.S. Cl.
CPC .............. *G09G 5/003* (2013.01); *G06F 3/1454* (2013.01); *G09G 5/12* (2013.01); *G09G 2370/025* (2013.01); *G09G 2370/042* (2013.01); *G09G 2370/10* (2013.01); *G09G 2370/16* (2013.01)

(58) Field of Classification Search
CPC ..... G09G 5/003; G09G 5/12; G09G 2370/16; G09G 2370/10; G09G 2370/042; G09G 2370/025; G06F 3/1454
See application file for complete search history.

(56) References Cited

U.S. PATENT DOCUMENTS

| 7,287,001 | B1* | 10/2007 | Falls et al. ....................... 705/22 |
| 2007/0223620 | A1* | 9/2007 | Kalhan et al. .................. 375/295 |
| 2010/0106588 | A1* | 4/2010 | Jones et al. ................. 705/14.24 |
| 2010/0157974 | A1* | 6/2010 | Nichols et al. ................ 370/350 |
| 2011/0164606 | A1* | 7/2011 | Kimura et al. ................ 370/350 |
| 2011/0193679 | A1* | 8/2011 | Okabe et al. .................... 340/5.9 |
| 2011/0285505 | A1* | 11/2011 | Ogura ............................ 340/6.1 |
| 2011/0289023 | A1* | 11/2011 | Forster et al. ................. 705/500 |
| 2011/0305294 | A1* | 12/2011 | Moriya et al. ................ 375/295 |
| 2011/0312266 | A1* | 12/2011 | Kono et al. ....................... 455/7 |

FOREIGN PATENT DOCUMENTS

CN   102131429 A   7/2011
TW   I263932 B   10/2006

OTHER PUBLICATIONS

Official Action issued on May 26, 2014, by the Taiwanese Patent Office in corresponding Taiwanese Patent Application No. 101103331.

* cited by examiner

*Primary Examiner* — Randy Flynn
(74) *Attorney, Agent, or Firm* — Muncy, Geissler, Olds & Lowe, P.C.

(57) ABSTRACT

A signal transmission system of electronic display devices includes a plurality of electronic display devices and a wireless signal transmission device. The wireless signal transmission device broadcasts a first packet data to the electronic display device. The first packet data comprises an access control address list, and the access control address list comprises the MAC address of a first group of electronic display device. When the wireless signal transmission device receives an acknowledgement (ACK) message from at least a first electronic display device of the first group of electronic display devices, the wireless signal transmission device changes the method of transmission from broadcast to unicast in order to transmit second packet data to the first electronic display device, wherein the second packet data comprises video packet data.

22 Claims, 5 Drawing Sheets

SIGNAL TRANSMISSION SYSTEMS OF ELECTRONIC DISPLAY DEVICES AND TRANSMISSION METHODS

CROSS REFERENCE TO RELATED APPLICATIONS

This application claims priority of Taiwan Patent Application No. 101103331, filed on Feb. 2, 2012, the entirety of which is incorporated by reference herein.

BACKGROUND OF THE INVENTION

1. Field of the Invention

The disclosure is related to a signal transmission system of an electronic display device.

2. Description of the Related Art

Electronic Shelf Label (ESL) Systems provide electronic shelf labels placed on shelves, replacing traditional paper price labels. Electronic shelf labeling makes it easy to modify the price of products, and doesn't waste a lot of human resources for modifying the paper price labels.

BRIEF SUMMARY OF THE INVENTION

An embodiment of the invention provides a signal transmission system of an electronic display device which comprises a plurality of electronic display devices; and a wireless signal transmission device configured to transmit a first packet data to the plurality of electronic display devices by broadcast, wherein the first packet data comprises an access control address list and the access control address list records an media access control address of a first group of electronic display devices of the plurality of electronic display devices; and when the wireless signal transmission device receives an ACK message from at least one first electronic display device of the first group of electronic display devices, the wireless signal transmission device changes the method of transmission from broadcast to unicast for transmitting a second packet data to the first electronic display device, wherein the second packet data comprises a video packet data, and when the access control address of the first group of electronic display devices is in the access control address list, the ACK message is transmitted to the wireless signal transmission device.

An embodiment of the invention provides a transmission method wherein the transmission method is appropriate for using in the environment of a signal transmission system of electronic display devices, comprising: a wireless signal transmission device transmitting a first packet data to the plurality of electronic display devices by broadcast, wherein the first packet data comprises an access control address list and the access control address list records an access control address of a first group of electronic display devices of the plurality of electronic display devices; and transmitting an ACK message to the wireless signal transmission device, when a MAC address of at least one first electronic display device is in the access control address list; and changing the method of transmission from broadcast to unicast for transmitting a second packet data to the first electronic display device, when the wireless signal transmission device receives the ACK message from the first electronic display device of the first group of the electronic display devices; wherein the second data comprises a video packet data.

BRIEF DESCRIPTION OF THE DRAWINGS

The invention will become more fully understood by referring to the following detailed description with reference to the accompanying drawings, wherein.

DETAILED DESCRIPTION OF THE INVENTION

Figure 1:
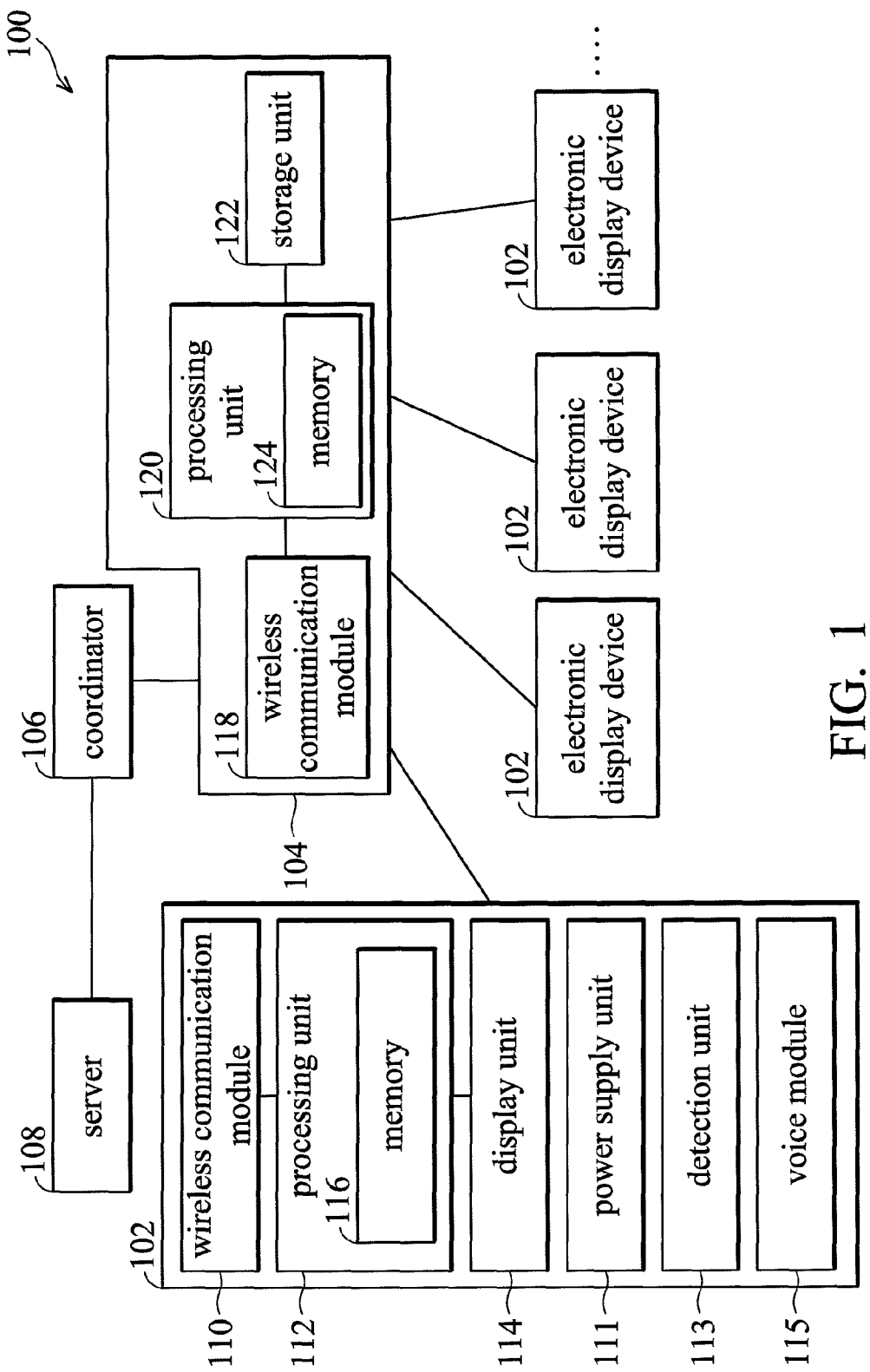
FIG. 1 is schematic diagram illustrating the signal transmission system 100 of the electronic display device according to an embodiment of the invention.

Embodiments, or examples, illustrated in the drawings are disclosed below using specific language. It will nevertheless be understood that the embodiments and examples are not intended to be limiting. Any alterations and modifications in the disclosed embodiments, and any further applications of the principles disclosed in this document are contemplated as would normally occur to one of ordinary skill in the pertinent art.

The embodiments of present invention could be applied to the signal transmission system of the electronic shelf label. There are some present methods of modifying the image data on the electronic shelf label. One method is that routers transmit the image data needed to be updated to each of the electronic shelf label via broadcast. Another method is that routers transmit the image data needed to be updated to each of the electronic shelf label by a unicast method.

FIG. 1 is a schematic diagram illustrating the signal transmission system 100 of an electronic display device according to an embodiment of the invention. The signal transmission system 100 comprises a plurality of electronic display devices 102, a wireless signal transmission device 104, a coordinator 106 and a server 108. For example, the electronic display devices 102 comprises a wireless communication module 110, power supply unit 111, processing unit 112, detection unit 113, display unit 114, and voice module 115.

The forms of display unit 114 comprise Electrophoretic Display, MEMS Display, Organic Light-Emitting Diode Display, and Liquid Crystal Display, wherein the MEMS Display comprises a mirasol display. Display unit 114 could be a display on the electronic shelf label or on the billboard. The Electrophoretic Display and the MEMS Display are activated only when the state of the display is changed. When the state of the display is not changed, power to the display would be closed, and the screen of the display still could maintain the display information, wherein the feature described above is called "bistable", and the feature is so electricity-saving that it is very well suited to application in an electronic shelf label environment.

The Power supply unit 111 comprises a battery wherein the battery could be a cylindrical battery (such as Zinc-MnO2 battery, Carbon-Zinc battery, Alkaline battery, Nickel-Metal Hydride battery or Nickel-Cadmium battery), a button battery (such as Mercury battery), a Lithium battery, a Solar Energy battery module or another power supply resource. Power supply unit 111 could be charged by a wireless transmission method, wherein the wireless transmission method comprises a radio frequency (RF) transmission method.

The Wireless communication module 110 and the wireless signal transmission device 104 transmit data to the server 108 by a wireless communication method. The wireless communication module 110 can be RF communication module, Bluetooth communication module, 3G communication module (such as CDMA module, WCDMA module or TD-SCDMA module), 4G communication module (such as LTE module or WIMAX module), Wi-Fi communication module, Near Field Communication (NFC) module or other wireless communication module. The Wireless signal transmission device 104 can be a wireless router, wireless transmission base station or any other device which transmits and receives signals by wireless transmission such as a mobile phone, tablet, or notebook computer.

The Processing unit 112 could be a central-processing unit (CPU) or a plurality of parallel processing units associated with the parallel processing environment, used to execute operation system, module and application program.

The Detection unit 113 comprises an optical sensor, such as an infrared ray sensor. When a customer passes through the electronic display devices 102, the detection unit 113 can sense the customer, and transmit a signal to the display unit 114 or the voice module 115. If the signal is transmitted to the display unit 114, the display unit 114 will alert the customer by some display state, e.g. reminding the customer that certain products are on sale or other activity information by a twinkling or animation method. If the signal is transmitted to the voice module 115, the voice module 115 will remind the customer by generating a voice. The Detection unit 113 and the voice module 115 could close their functions by the server 108 via a wireless network and the wireless signal transmission device 104.

For example, the wireless signal transmission device 104 comprises wireless communication module 118, processing unit 120 and storage unit 122. The Wireless communication module 118 transmits data with the electronic display devices 102 and coordinator 106 by wireless network, wherein the wireless communication module 118 can be an RF communication module, Bluetooth communication module, 3G communication module (such as CDMA module, WCDMA module or TD-SCDMA module), 4G communication module (such as LTE module or WIMAX module), Wi-Fi communication module, Near Field Communication (NFC) module or other wirelss communication module. In one embodiment of the invention, the wireless signal transmission device 104 and the coordinator 106 transmit data by wireless network protocol Zigbee used in low rate and short distant transmission. For example, the processing unit 120 could be a central-processing unit (CPU) or a plurality of parallel processing units associated with the parallel processing environment, used to execute an operation system, module and application program. The Storage unit 122 can be ROM memory, flash memory, RAM memory, EPROM memory, EEPROM memory, registers, a hard disk and/or any other form of computer-readable storage medium known in the skill of art.

In one embodiment of the invention, the server 108 has a storage unit (not present) configured to store the data (video data and/or audio data) input by user, wherein the video data and the audio data are the price of a product, a text description or product-selling description. For example, when a user wants to change the price, image or voice of the product displayed in the electronic display devices 102 which is on the shelf, the user can store the video data or the audio data of the product in the server 108 in advance, wherein the video data or the audio data comprise the price, the text description, e.g. on sale, picture or voice. Each single unit of video data or audio data corresponds to a product, and the electronic display device 102 of every product has a unique media access control (MAC) address. Therefore, each unit of video data or audio data has the MAC address corresponding to the electronic display device 102. Then, the server 108 transmits the video data or audio data in the form of packet data (video packet or audio packet) to the coordinator 106 by a network, wherein the video data or audio data is stored in the storage unit. Then, the coordinator 106 transmits the received packet to the wireless signal transmission device 104 by the network. The wireless signal transmission device 104 stores the packet data received from the coordinator 106 in the storage unit 122. The processing unit 120 executes a program in the memory 124 to read the MAC address of every electronic display device 102 corresponding to every received packet, and record the plurality of the read MAC address in an access control address list. In other words, the access control address list has the MAC address corresponding to every packet data stored in the storage unit 122. For example, the access control address list comprises MAC addresses of all electronic display devices 102 (i.e. all electronic display devices 102 have to be updated by packet data), or MAC addresses for partial electronic display devices 102 (i.e. partial electronic display devices 102 have to be updated by packet data).

Then, the wireless communication module 118 of the wireless signal transmission device 104 broadcasts the access control address list to all electronic display devices 102. When the wireless communication module 110 of the electronic display device 102 receives the access control address list, the wireless communication module 110 transmits an interrupt signal to the processing unit 112 and the power supply unit 111. The processing unit 112 and the power supply unit 111 wake up from a sleep state when receiving the interrupt signal, and then receive the access control address list from the wireless communication module 110. Then, the processing unit 112 executes a program in the memory 116 for contrasting whether the access control address list has the MAC address of the electronic display device 102. When the access control address list doesn't have the media access control address of the electronic display device 102, the processing unit 112 and the power supply unit 111 will go back to sleep mode. When the access control address list has the MAC address of the electronic display device 102, the processing unit 112 makes the wireless communication module 110 transmit an acknowledge (ACK) message to the wireless signal transmission device 104.

When the wireless communication module 118 of the wireless signal transmission device 104 receives the ACK message from the electronic display device 102 in a preset time, the wireless signal transmission device 104 will modify the method of transmitting packet data from broadcast mode to unicast mode, and transmit the corresponded video packet and audio packet stored in the storage unit 122 to the electronic display device 102 corresponding to the ACK message by the wireless communication module 118. At this time, the transmitted packet data would comprise the MAC address of the electronic display device 102, so if the transmitted packet data doesn't comprise the MAC address of the electronic display device 102, the electronic display device 102 doesn't receive the packet data. After the electronic display device 102 receives the packet data transmitted from the wireless communication module 118, the processing unit 112 transmits the video data of the packet data to the display unit 114 and transmits the audio data to the voice module 115. It updates the video file displayed in the display unit 114 with received video data, and/or the audio file played in the voice module 115 with received audio data. In addition, the processing unit 120 of the wireless signal transmission device 104 will delete the MAC address of the electronic display device 102 from the access control address list, wherein the packet data of the electronic display device 102 is updated.

When the wireless communication module 118 of the wireless signal transmission device 104 doesn't receive the ACK message from the electronic display device 102 in a preset time, the processing unit 120 will determine whether all electronic display devices 102 are updated by the packet data according to the access control address list. If some electronic display devices 102 in the access control address list are still not updated by the packet data, the wireless communication module 118 of the wireless signal transmission device 104 will continuously broadcast the access control address list to all electronic display devices 102. If all electronic display devices 102 in the access control address list have been updated by the packet data, the wireless communication module 118 of the wireless signal transmission device 104 will stop broadcasting the access control address list to all electronic display devices 102.

Figure 2:
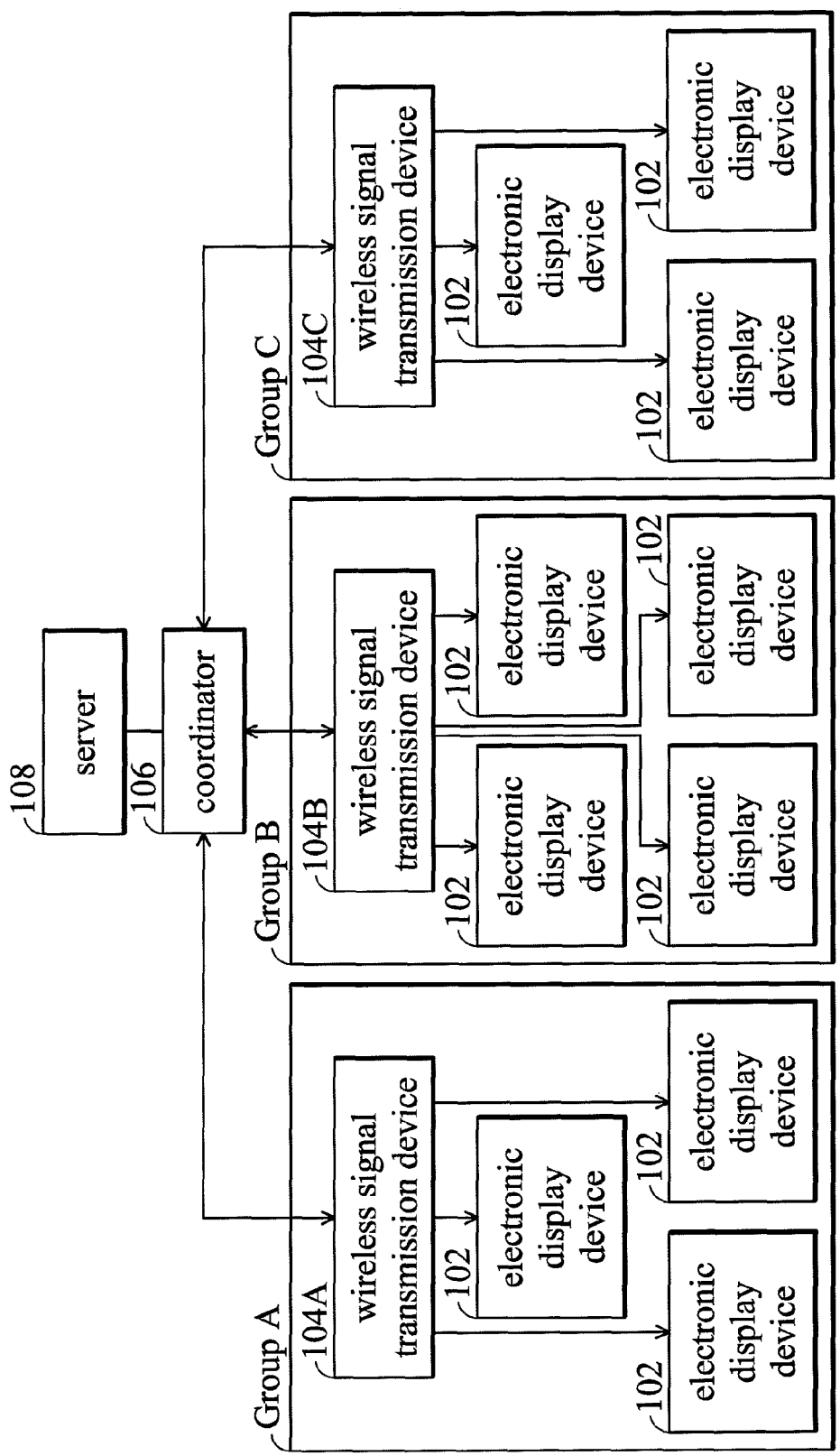
FIG. 2 is schematic diagram illustrating the signal transmission system of the electronic display device according to another embodiment of the invention.

FIG. 1 is an embodiment of a single signal transmission group. According to the concept illustrated in FIG. 1, it could develop the multi-signal transmission groups. FIG. 2 is schematic diagram illustrating the signal transmission system of an electronic display device according to another embodiment of the invention. In the embodiment, there are groups A, B, and C, wherein the signal transmission method of each group is the same as in FIG. 1. Multi-signal transmission groups can support each other by the coordinator 106. For example, when the wireless signal transmission device 104A in group A has been converted to operate in unicast mode and updating one of the electronic display devices in group A by transmitting the packet data, if the wireless signal transmission device 104B in group B is in idle mode, the wireless signal transmission device 104B will be switched to unicast mode by the coordinator 106, and the wireless signal transmission device 104B updates the electronic display devices in group A which still have not been updated by transmitting the packet data.

Figure 3A:
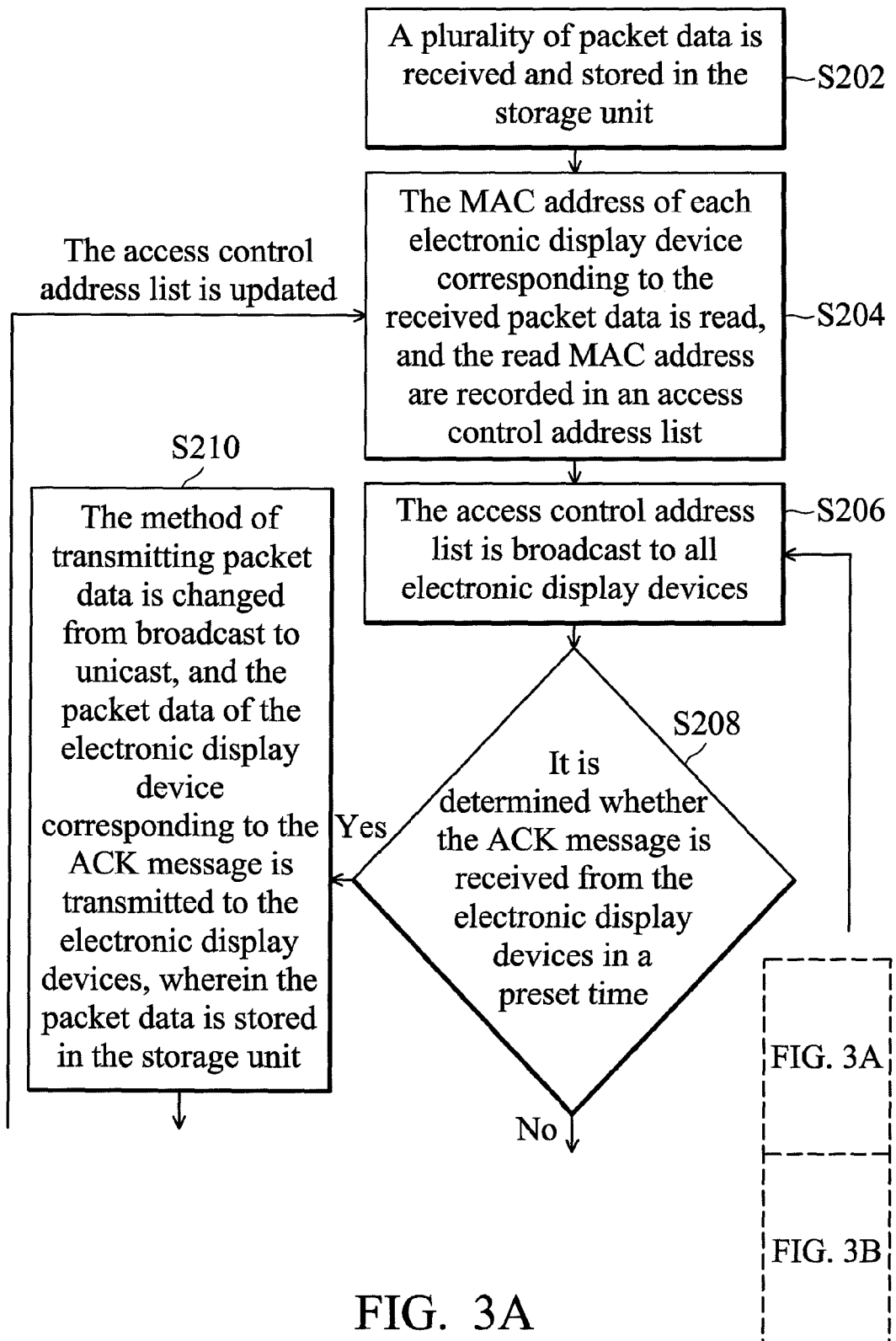
FIGS. 3A-3B are a flowchart of the transmission method according to an embodiment of the invention.
Figure 3B:
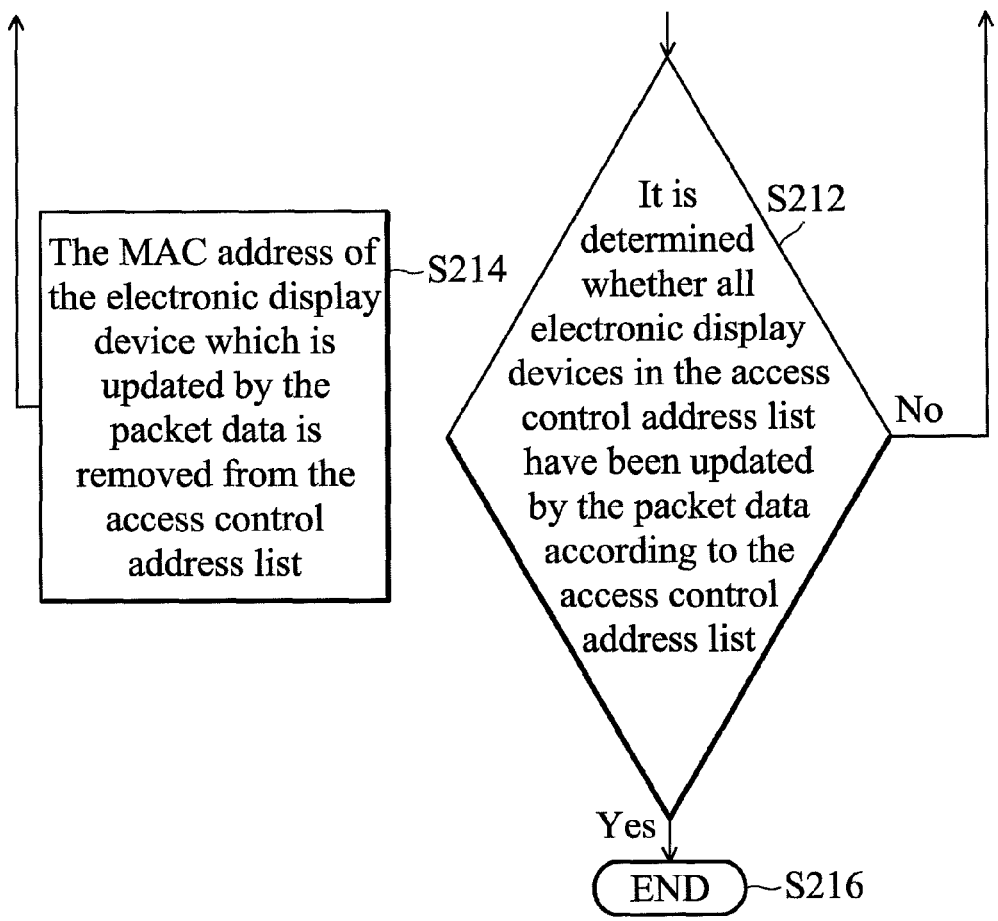

FIGS. 3A-3B are a flowchart of the transmission method according to an embodiment of the invention, wherein the method is appropriate for using in the environment of an electronic display device system. In step S202, a plurality of packet data is received and stored in the storage unit, wherein the packet data comprise the video data and/or audio data corresponding to each electronic display device, and the packet data comprise the product price, a text description or product-selling description. In step S204, the MAC address of each electronic display device corresponding to the received packet data is read, and the read MAC address are recorded in an access control address list. In other words, the access control address list has the MAC address corresponding to every packet data stored in the storage unit. For example, the access control address list comprises the MAC address of all electronic display devices (i.e. all electronic display devices have to be updated by packet data), or the MAC address of partial electronic display devices (i.e. partial electronic display devices have to be updated by packet data). In step S206, the access control address list is broadcast to all electronic display devices. In step S208, it is determined whether the ACK message is received from the electronic display devices in a preset time. When the ACK message is received from an electronic display device in a preset time, step S210 is executed; when the ACK message is not received from an electronic display device in a preset time, step S212 is executed. In step S210, the method of transmitting packet data is changed from broadcast to unicast, and the packet data of the electronic display device corresponding to the ACK message is transmitted to the electronic display devices, wherein the packet data is stored in the storage unit. In step S214, the MAC address of the electronic display device which is updated by the packet data is removed from the access control address list, and a deleted message is returned to step S204 for updating the access control address list.

In step S212, it is determined whether all electronic display devices in the access control address list have been updated by the packet data according to the access control address 15, list. When there are electronic display devices in the access control address list that have not been updated, step S206 is executed; when all electronic display devices in the access control address list are updated, step S216 is executed to stop the flowchart of FIGS. 3A-3B.

Figure 4:
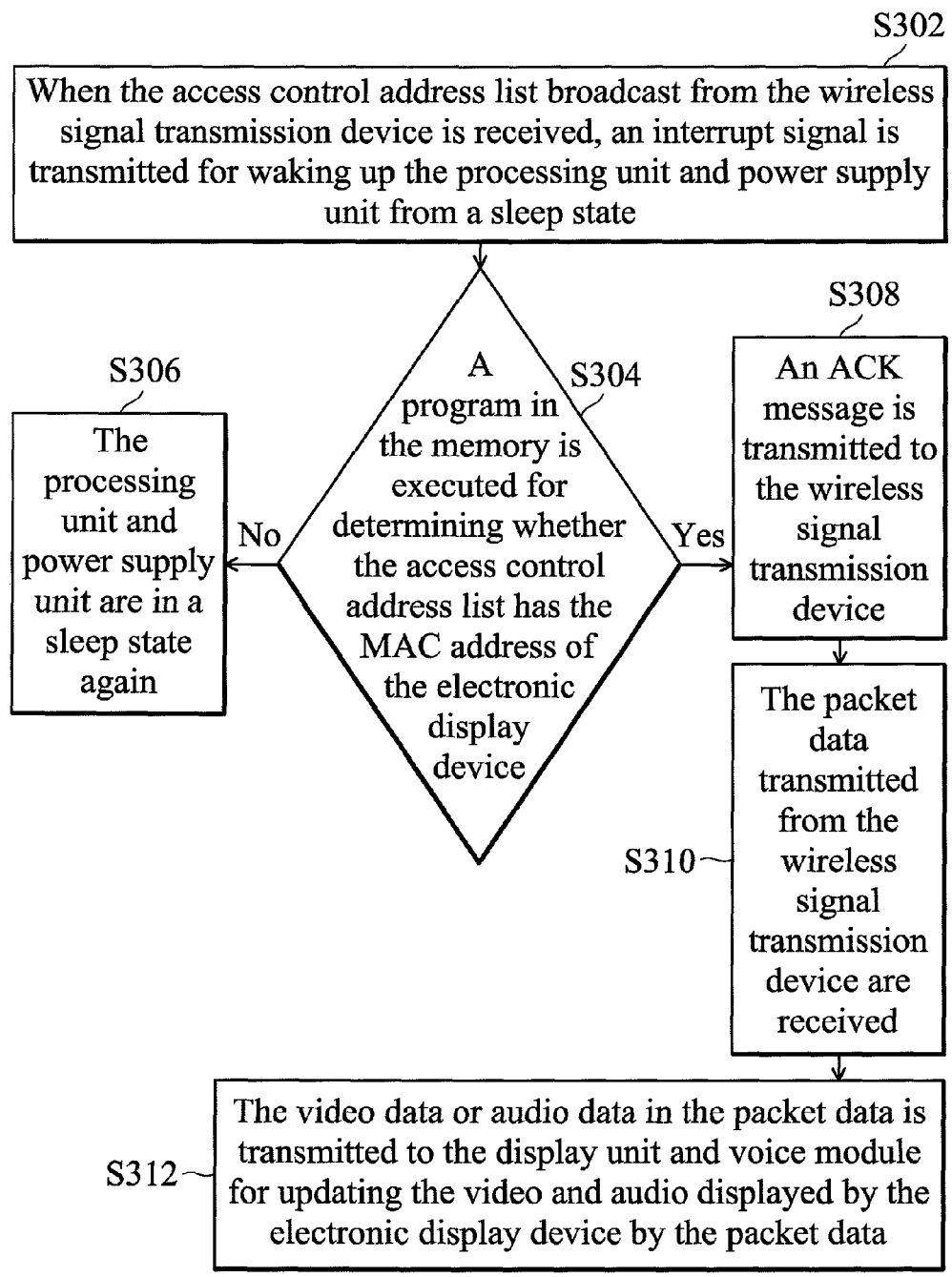
FIG. 4 is a flowchart of the transmission method according to an embodiment of the invention.

FIG. 4 is a flowchart of the transmission method according to an embodiment of the invention, wherein the method is appropriate for using in the environment of an electronic display device. In step S302, when the access control address list broadcast from the wireless signal transmission device is received, for example, by the electronic display device 102, an interrupt signal is transmitted for waking up the processing unit and power supply unit from a sleep state. In step S304, a program in the memory is executed for determining whether the access control address list has the MAC address of the electronic display device. When the access control address list doesn't have the MAC address of the electronic display device, step S306 is executed; when the access control address list has the MAC address of the electronic display device, step S308 is executed. In step 306, the processing unit and power supply unit are in a sleep state again. In step 308, an ACK message is transmitted to the wireless signal transmission device. In step S310, the packet data transmitted from the wireless signal transmission device are received. In step S312, the video data or audio data in the packet data is transmitted to the display unit and voice module for updating the video and audio displayed by the electronic display device by the packet data.

The transmission system and method disclosed in the invention can increase the throughput and size of the transmission data, and provide a transfer guarantee in the environment of an electronic display device system.

The above paragraphs describe many aspects of the invention. Obviously, the teaching of the invention can be accomplished by many methods, and any specific configurations or functions in the disclosed embodiments only present a representative condition. Those who are skilled in this technology can understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A signal transmission system of an electronic display device, comprising:
    a plurality of electronic display devices;
    a wireless signal transmission device, configured to transmit a first packet data to a first group of electronic display devices of the plurality of electronic display devices by broadcast, wherein the first packet data comprises an access control address list and the access control address list records an media access control address of the first group of electronic display devices; and when the wireless signal transmission device receives an ACK message from at least one first electronic display device of the first group of electronic display devices, the wireless signal transmission device changes the method of transmission from broadcast to unicast for transmitting a second packet data to the first electronic display device;

a second wireless signal transmission device, configured to change the method of transmission from broadcast to unicast for transmitting the second packet data to the first electronic display device which has not been updated when the second wireless signal transmission device is in an idle mode, wherein the second packet data comprises a video packet data, and when the access control address of the first group of electronic display devices is in the access control address list, the ACK message is transmitted to the wireless signal transmission device.

2. The system of claim 1, wherein the wireless signal transmission device comprises a first processing unit and a first wireless communication module, and the first wireless communication module is configured to transmit the first packet data and the second packet data and receive the ACK message.

3. The system of claim 2, wherein when the first wireless communication module doesn't receive the ACK message from at least one second electronic display device of the plurality of electronic display devices in a preset time, the first processing unit is configured to contrast the ACK message and the access control address list for determining if all electronic display devices of the access control address list are updated by the second packet data.

4. The system of claim 3, wherein when any one of the first group of electronic display devices is not updated by the second packet data, the first wireless communication module transmits the access control address list to the electronic display devices by continuous broadcast.

5. The system of claim 1, wherein the wireless signal transmission device comprises a first processing unit and a first wireless communication module, and when the first wireless communication module receives the ACK message from the first electronic display device, the first processing unit removes the access control address of the first electronic display device which has been updated by the second packet data from the access control address list.

6. The system of claim 1, wherein each of the electronic display devices comprises a second processing unit and a second wireless communication module, and when the second wireless communication module receives the first packet data, the second wireless communication module transmits a signal to the second processing unit, and it makes the second processing unit wake up from a sleep mode.

7. The system of claim 6, wherein when the second processing unit determines the access control address is not in the access control address list, the second processing unit will enter sleep mode again.

8. The system of claim 6, wherein when the second processing unit determines the access control address is in the access control address list, the second wireless communication module transmits the ACK message to the wireless signal transmission device.

9. The system of claim 1, wherein the second packet data further comprises an audio packet data.

10. The system of claim 1, wherein the electronic display device further comprise a power supply unit.

11. The system of claim 10, wherein the power supply unit can be charged by a wireless transmission method.

12. The system of claim 11, wherein the wireless transmission method comprises a radio frequency transmission method.

13. The system of claim 1, wherein the electronic display device comprises a display unit, the display unit is a MEMS display or Electrophoretic display.

14. The system of claim 1, wherein the electronic display device is an electronic shelf label.

15. The system of claim 1, wherein second wireless signal transmission device is configured to transmit a third packet data to a second group of electronic display devices of the plurality of electronic display devices by broadcast, wherein the third packet data comprises an access control address list and the access control address list records an media access control address of the second group of electronic display devices.

16. A transmission method, comprises:
transmitting a first packet data to a first group of electronic display devices of a plurality of electronic display devices in the way of broadcast by a wireless signal transmission device, wherein the first packet data comprises an access control address list and the access control address list records an access control address of the first group of electronic display devices; and transmitting an ACK message to the wireless signal transmission device, when a MAC address of at least one first electronic display device is in the access control address list; and changing the method of transmission of the wireless signal transmission device from broadcast to unicast for transmitting a second packet data to the first electronic display device, when the wireless signal transmission device receives the ACK message from the first electronic display device of the first group of electronic display devices;

changing the method of transmission of a second wireless signal transmission device from broadcast to unicast for transmitting the second packet data to the first electronic display device, which has not been updated when the second wireless signal transmission device is in an idle mode, wherein the second packet data comprises a video packet data.

17. The method of claim 16, wherein the wireless signal transmission device comprises a first processing unit and a first wireless communication module, and the first wireless communication module is configured to transmit the first packet data and the second packet data and receive the ACK message.

18. The method of claim 17, wherein when the first wireless communication module doesn't receive the ACK message from at least one second electronic display device of the first group of electronic display devices in a preset time, the first processing unit is configured to contrast the ACK message and the access control address list for determining if all electronic display devices of the access control address list are updated by the second packet data.

19. The method of claim 18, wherein when any one of the first group of electronic display devices is not updated by the second packet data, the first wireless communication module transmits the access control address list to the electronic display devices by continuous broadcast.

20. The method of claim 16, wherein the wireless signal transmission device comprises a first processing unit and a first wireless communication module, and when the first group of electronic display devices receive the ACK message from the first electronic display device, the first processing unit removes the access control address of the first electronic display device which has been updated by the second packet data from the access control address list.

21. The method of claim 16, wherein each of the electronic display devices comprises a second processing unit and a second wireless communication module, and when the second wireless communication module receives the first packet data, the second wireless communication module transmits a signal to the second processing unit, and it makes the second processing unit wake up from a sleep mode.

22. The method of claim 16, further comprising:
   transmitting, by the second wireless signal transmission device, a third packet data to a second group of electronic display devices of the plurality of electronic display devices by broadcast, wherein the third packet data comprises an access control address list and the access control address list records an media access control address of the second group of electronic display devices.

\* \* \* \* \*